United States Patent [19]
Daniel

[11] 3,913,850
[45] Oct. 21, 1975

[54] MOBILE TIRE SHREDDER

[76] Inventor: William E. Daniel, 21 5th Ave., Corcoran, Calif. 93212

[22] Filed: Apr. 26, 1973

[21] Appl. No.: 354,493

[52] U.S. Cl. ................ 241/101.7; 241/92; 241/277
[51] Int. Cl.² .......................................... B02C 21/02
[58] Field of Search .. 241/92, 101.7, 101 M, 152 R, 241/152 A, 159, 277, 280, 282.1, 282.2, DIG. 31

[56] References Cited
UNITED STATES PATENTS

| | | | |
|---|---|---|---|
| 1,607,291 | 11/1926 | Marie | 241/DIG. 31 |
| 2,081,001 | 5/1937 | Coscia | 241/92 |
| 2,150,984 | 3/1939 | Near et al. | 241/280 |
| 2,645,500 | 7/1953 | Moss | 241/101.7 X |
| 3,661,329 | 5/1972 | Smith et al. | 241/92 |
| 3,721,392 | 3/1973 | Burwell | 241/280 X |

Primary Examiner—Roy Lake
Assistant Examiner—E. F. Desmond

[57] ABSTRACT

Disclosed is a mobile shredding machine for shredding vehicle tires. The machine has a rotating flywheel with a pair of projecting radially extending blades on one face thereof. The flywheel is mounted on a truck chassis and driven by an electric motor powered by a motor generator. The electric motor has controls so that the speed of rotation of the flywheel can be regulated. The flywheel is mounted in a frame on the truck chassis which supports a fixed blade in shearing relationship with said flywheel blades. Tires are fed to the flywheel by a feed conveyor which flattens the tire carcasses and feeds them to the blades in this condition. The flywheel is surrounded by a housing which fits with close tolerances the periphery of the wheel and the rotating blades on the face surface, so that shreds are carried in rotation with the flywheel after they are cut onto a shred discharge conveyor at the side of the truck chassis which carries them to a shred pile or into a hauling truck.

12 Claims, 6 Drawing Figures

MOBILE TIRE SHREDDER

BACKGROUND OF INVENTION

This invention relates generally to shredding machines and more particularly machines adapted for shredding tire carcasses.

Tire carcasses are becoming quite difficult to dispose of because of their increasing number, the limited availability of dump areas, and their slow rate of disintegration when subjected to the elements. To reduce the environmental detriment occasioned by tire carcasses, stringent requirements respecting the method of their disposal are being placed upon salvage companies by public entities.

Many public entities now require that tires be deposited only in specially arranged pits and buried. This method has severe limitations, however, because of the lack of available areas for this purpose.

Because of the problems related to disposition of worn out vehicle tires, many alternate techniques have been considered and experimented with such as burning the tires or shredding them. Burning the tires has not proven successful because of the expense and resultant air pullution. Shredding has heretofore proven too expensive because no economical means of accomplishing it has been developed.

It is, therefore, a major object of my invention to provide a vehicle tire shredder that is capable of economically shredding tire carcasses.

It is also an important object of my invention to provide a tire shredder which is mobile, and can shred worn out tires at the point of pickup to avoid the expense of hauling such a bulky load.

It is another object of my invention to provide a mobile tire shredder of the type described in which tire carcasses are fed to the shredder in a flattened condition to enhance their shreddability.

It is a further object of my invention to provide a tire shredder of the type described in which the processing of the tire from pickup of the carcass to delivery of the shreds is substantially automatic and the entire operation can be handled by one man.

It is yet another object of my invention to provide a tire shredder of the type described in which quantities of the carcasses can be fed to the shredder at one time and the shreds can be continuously delivered into a truck body for hauling to a storage pile.

It is still a further object of my invention to provide a mobile tire shredder of the type described which has a sufficient production capacity and durability to make the shredding of tire carcasses economical.

These and other objects and advantages of my invention will become more readily apparent from the following detailed description of a preferred embodiment and the accompanying drawings, in which:

Figure 1:
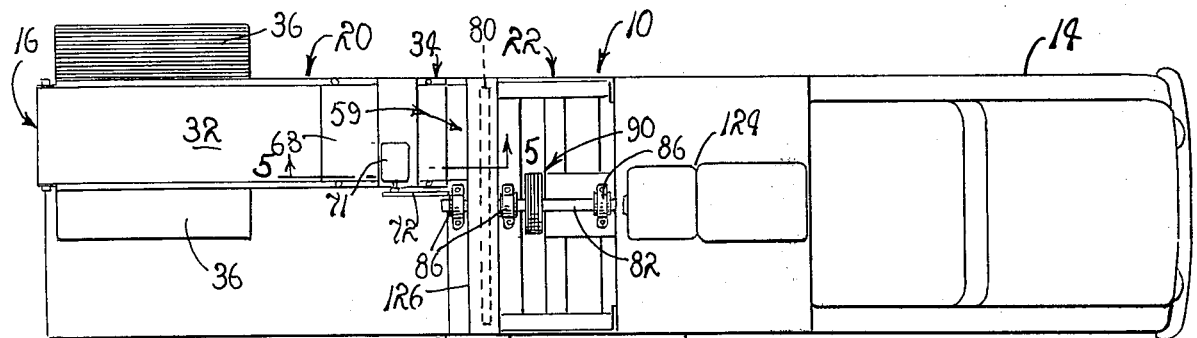
FIG. 1 is a plan view of a preferred embodiment of my invention shown mounted on a truck chassis for mobility.
Figure 6:
Figure 2:
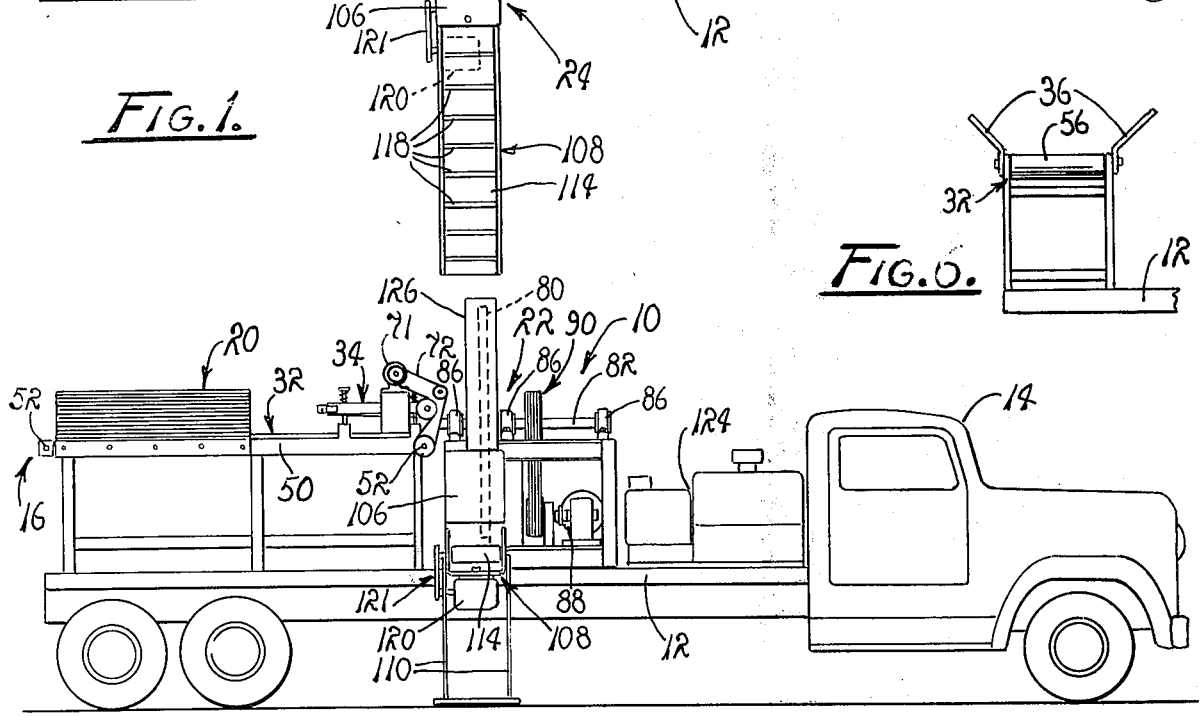
FIG. 2 is a side elevational view of the preferred embodiment shown in FIG. 1.

Referring now to the drawings, and particularly FIG. 1 and 2 thereof, the numeral 10 represents my mobile tire shredder generally. The tire shredder 10 is mounted on the chassis 12 of a truck 14 with the receiving end 16 of the shredder directed rearwardly. The shredder is made up generally of three components, a tire carcass delivery mechanism 20, a shredder mechanism 22 and a shred discharge mechanism 24.

Figure 5:
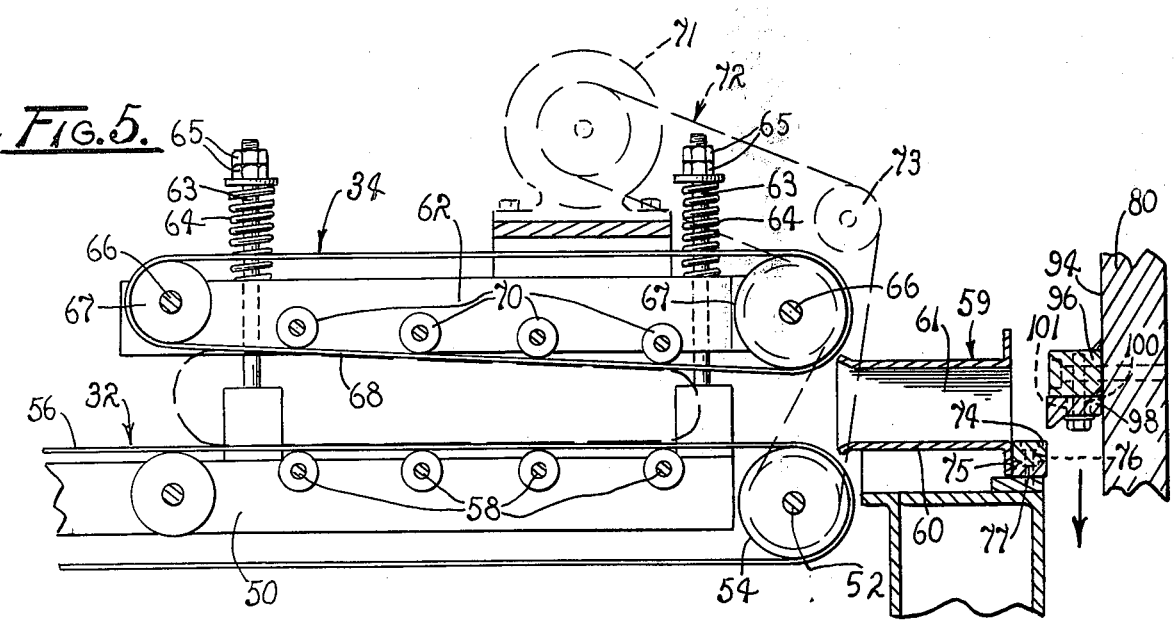
FIG. 5 is an enlarged sectional view taken on line 5—5 in FIG. 1, and showing particularly a tire carcass compressed by the feed conveyor for delivery to the cutting blades.
Figure 3:
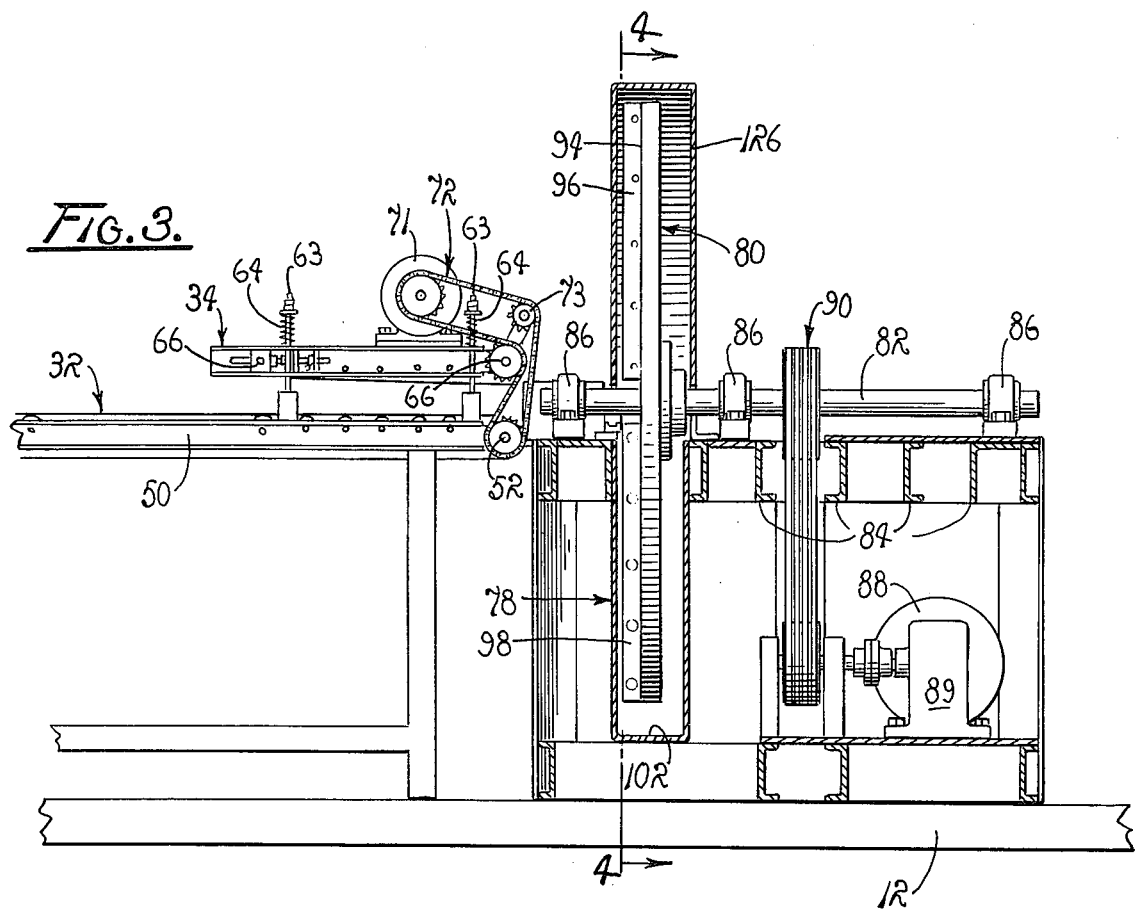
FIG. 3 is an enlarged cross-sectional view of the cutting wheel and carcass feed portion of the preferred embodiment shown in FIG. 1.
Figure 4:
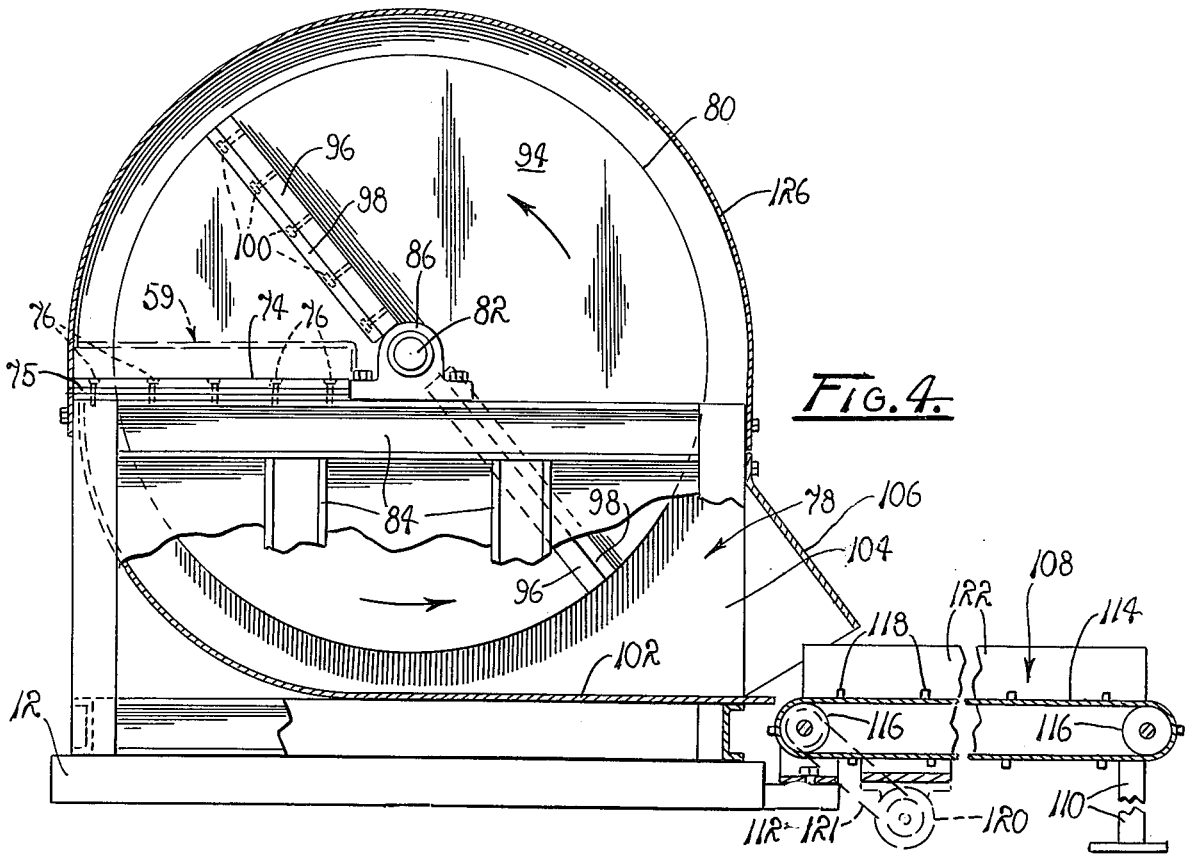
FIG. 4 is an enlarged sectional view of the preferred embodiment of FIG. 1 taken on 4—4 in FIG. 3 and showing particularly shredding blades and the structure for delivering shreds to the discharge conveyor.

The tire delivery mechanism 20 is utilized to receive a quantity of tire carcasses at one time, to separate these carcasses and deliver them, one at a time, to the shredder 22 mechanism with the delivered tire carcasses being in flattened condition to facilitate the shredding. As best shown in FIGS. 1, 2 and 5, delivery mechanism 20 has a support conveyor 32 which receives carcasses at the rear of the chassis and carries them to shredder mechanism 22, and a press conveyor 34 which compresses the tire carcasses against the support conveyor and holds them in a flattened condition as they are delivered to the shredder.

The tire receiving end of the support conveyor has downwardly tapered side walls 36 to guide tire carcasses onto the conveyor.

The support conveyor 32 has a frame 50 in which axles 52 are rotatably mounted. The axles 52 each carry belt rollers 54 which in turn carry conveyor belts 56. Mounted in the frame 50 of the support conveyor 32 between opposite runs of the belt 56 are support rollers 58 on which the belt rides. The support rollers 58 prevent the upper run belt 56 from being pressed downwardly into the frame 50 when a tire carcass is squeezed down upon the support conveyor 32 by the press conveyor 34. At its end adjacent the shredder 22, the support conveyor 32 has a transfer throat 59 with a base 60 which is disposed flush with the upper surface of the support conveyor, adjacent its delivery end. The base plate 60 provides a continuity of support for the carcasses between the support conveyor 32 and the shredder mechanism 22 and mounts the fixed cutting blade of the shredding wheel. The housing 61 which constitutes the balance of the transfer throat 59 contains the carcass during shredding and shields personnel from shredded pieces.

To flatten tire carcasses traveling on the support conveyor 32 to the shredder mechanism 22, the press conveyor 34 is mounted just above the support conveyor 32 and nearer the delivery end of that conveyor. The press conveyor 34 has a frame 62 which is mounted on pins 63 extending upward from the support conveyor frame 52 for reciprocating vertical movement with respect to the support conveyor. Compression springs 64 are positioned on the upper ends of each of the pins 63 and held in place by adjustment nuts 65. The compression springs 64 urge the press conveyor downward toward the support conveyor and provide the compression force for the carcasses. The press conveyor frame 62 has axles 66 rotatably mounted at each end. The axles 66 each have belt rollers 67 mounted theron which carry belts 68. Between opposite lengths of the belts, press rollers 70 are provided in the frame. At the receiving end of the press conveyor 34 the belt roller 66 has a slightly smaller diameter than the belt roller at the delivery end and therefore provides a wedge between the conveyors at the receiving ends.

The press conveyor 34 is somewhat shorter than the support conveyor 32 so that tire carcasses dropped on the support conveyor at the receiving end have space to fall into a flat position before they reach the wedge area at the receiving end of the press conveyor. At this point, the tire carcasses are pressed between the press conveyor 34 and the support conveyor 32 until they reach the shredder mechanism 22 via the transfer throat 59.

The shredder mechanism 22 has a fixed blade 74 mounted adjacent the transfer throat base 60 as previously described. The fixed blade 74 is held in place by countersunk bolts 76 and can be removed for resharpening or replacement. The fixed blade 74 is positioned accurately by means of a tongue and groove structure 77 between the blade and its mounting surface (see FIG. 5).

Adjacent the fixed blade 74 is a cutting wheel cavity 78 in which a cutting wheel 80 is rotatably mounted. The cutting wheel 80 is supported on a cutting wheel shaft 82 which is mounted on the truck chassis 12 by a cutting wheel support frame 84. The cutting wheel shaft 82 is mounted on the upper portion of the cutting wheel support frame 84 by means of three bearing blocks 86 and is driven by an electric drive motor 88 through a reduction gear 89.

On its rearward face 94, the cutting wheel 80 has a pair of oppositely disposed, radially directed blade blocks 96 on which movable cutting blades 98 are mounted. The blade blocks 96 have countersunk bolts 100 extending through them which secure the cutting blades 98 to the blade blocks and permit removal of the cutting blades for sharpening or replacement. The cutting wheel 80 rotates counter-clockwise as viewed from the rear looking forwardly so that the movable cutting blades 98 pass downwardly when they move in shearing relationship with the fixed blade 74. The movable cutting blades 98 are attached to the blade blocks 96 so that they are on the lower side of the blade blocks when moving downward into shear with the fixed blade 74, and the blade blocks therefore provide support for the cutting blade as the shearing occurs.

To accomplish shearing action between the moving cutting blades 98 and the fixed blade 74, the fixed blade is positioned so that its cutting edge projects into the cutting wheel cavity 78 a sufficient distance to place it in shearing relationship with the movable cutting blades 98 on the cutting wheel 80.

After shearing has occurred the shreds of the tire carcasses are carried from the shredding mechanism to a desired delivery point by the shred discharge mechanism 24. To prevent shreds cut from a tire carcass by the movable cutting blades on cutting wheel 80 from dropping out of the cutting wheel cavity 78 and to carry these shreds to a discharge point, a shroud 102 is provided around the lower half of the cutting wheel 80 with a discharge port 104. Discharge port 104 is covered by a deflector flue 106 which directs the shreds passing through the discharge port downwardly onto a discharge conveyor 108. The discharge conveyor 108 is pivotally mounted to the truck chassis for movement from a stowed position parallel to the truck chassis and with its distal end extending forward from the mounting position, to a working position in which it extends generally normal to the truck chassis with its distal end outwardly therefrom and disposed adjacent a hauling truck body or other suitable collector for the shreds. At its distal end, the discharge conveyor 108 has extendable mounting supports 110 which support the outer end at variable heights to permit shreds to be delivered as desired. To permit up and down movement and horizontal pivoting of the proximal end of the discharge conveyor 104, a universal pivot 112 is provided at the connection of the discharge conveyor proximal end to the chassis 12.

The discharge conveyor 104 has a movable belt 114 mounted on a pair of rotating rollers 116 and 118, one at each end of the conveyor. The roller 116 at the proximal end of the conveyor is motor driven to rotate the belt 114 in the usual manner. The belt 114 is provided with lateral cleats 120 that travel with the belt and carry shreds to the delivery end of the conveyor, and with upstanding sides 122 which hold the shreds on the conveyor belt.

OPERATION

Having described the various parts of my mobile tire shredder, I will now describe its operation. My movable tire shredder 10 is driven to the site of tire carcasses to be disposed of, thereby considerably reducing the cost of hauling the bulky carcasses. With my mobile shredder on site, tire carcasses are dumped onto the receiving end of the support conveyor 32 and the shredder is placed in operation by starting up a motor generator 124 positioned on the truck chassis forwardly of the cutting wheel support frame. A feeder mechanism drive motor 71 is mounted on top of the press conveyor 34 and is drivingly connected to the delivery end belt rollers of both the support conveyor and the press conveyor by means of a drive chain 72 and an idler sprocket 73. The feeder mechanism drive motor 126 is electric and has a speed control, as does the delivery conveyor drive motor 120. Prior to this, the discharge conveyor 108 will have been swung from its stowed position alongside the chassis 12 of the truck 14 to its outwardly extended position substantially normal to the chassis, and adjacent a shred receiving bin or truck body, and then regulated at its distal end by means of the extendable supports 110 to place it at the proper height to discharge the shreds into the shred collector being used.

When the motor generator 124 has been started up the cutting wheel drive motor 88, feeder mechanism drive motor 71 and the delivery conveyor drive motor 120 are all started and regulated to the desired speeds.

The tire carcasses then are fed one at a time to the cutting wheel by the support conveyor 32 carrying carcasses forwardly from its receiving end and delivering them under the press conveyor 34 and in a compressed condition into the shearing plane between the fixed blade 78 and the cutting blades 98 on the cutting wheel 80. The speed with which the support conveyor 32 delivers the tires to the cutting wheel 80 and the rotating speed of the cutting wheel are then coordinated to regulate the size of the shred. The speed of the discharge conveyor 108 of the shred discharge mechanism 24 can also be further regulated to assure proper handling of the shreds delivered to it. The respective speeds of the conveyors in the tire delivery mechanism 20, the discharge conveyor 108 and the cutting wheel 80 may also be regulated to the type of tires being shredded and to the sharpness of the cutting blades, to assure effective performance of the shredder.

Whenever required, the shredder can be shut down and both the fixed blade 78 and the cutting blades 98 changed by simply loosening the bolts 76 and 100 respectively, and inserting a new blade or removing, resharpening and returning the old blades.

From this detailed description of the parts and operation of my mobile shredder it will thus be understood that I have provided a mobile tire shredding machine which is fully capable of achieving the objects and providing the advantages heretofore attributed to it.

My shredder can be driven to a storage site for old tire carcasses and utilized to reduce the carcasses to shreds which are considerably more economical to haul, thus providing a cost savings in handling. When shredded the old tires are much easier to dispose of than are the carcasses themselves so that my shredder overcomes major obstacles presently existing in the disposition of old tires.

The tire delivery mechanism of my shredder permits tires to be readily loaded into the shredder, and delivered to the cutting wheel individually and in compressed condition to facilitate their shredding. My shredding mechanism, for the first time, provides a means of economically shredding carcasses because of its inertia, and readily adjustable speed. Finally, my shredder provides a simple automated method of delivering the shreds to a collector for final disposal.

More important, with my shredder all of this can be accomplished with a minimum amount of handling and, therefore, a minimum crew of workmen. Actually, one properly trained workman can operate my shredder and dispose daily of large quantities of tire carcasses.

I claim:

1. A tire shredder comprising:
a frame mounted on a mobile chassis;
a shredding mechanism mounted on said frame and disposed to shred tire carcasses, said shredding mechanism including a flywheel rotatably mounted in said frame and disposed generally vertically in said frame, said flywheel being rotatable about a flywheel axis and having a face surface disposed normal to said flywheel axis, a rotary blade mounted on said face surface of said flywheel and having a cutting edge disposed radially with respect to said flywheel axis, and a fixed blade mounted adjacent said flywheel and disposed to pass in shearing relationship with said rotary blade on rotation of said flywheel;
a tire feeding mechanism operatively associated with said frame and shredding mechanism and having a receiving portion and a discharge portion, said feeding mechanism being disposed in axial alignment with the axis of said flywheel and with said discharge portion adjacent said flywheel face surface to receive tire carcasses at said receiving portion and deliver said carcasses at said discharge portion to said shredding mechanism; and
a shred handling mechanism operatively associated with said frame and interconnected with said shredding mechanism to receive and dump shreds passing out of said shredding mechanism.

2. A tire shredder of the type described in claim 1, in which:
said tire shredder further includes drive means interconnected with said shredding mechanism, feeding mechanism and shred handling mechanism and disposed to drivingly operate said mechanisms.

3. A tire shredder as described in claim 1, in which:
said tire feeding mechanism including a compression means disposed adjacent the discharge portion thereof and operable to axially flatten the carcass of a tire and feed said tire to said shredding mechanism in said compressed condition.

4. A tire shredder as described in claim 1, in which:
said shred handling mechanism is mounted on said frame and disposed adjacent said shredding mechanism and includes a shred conveyor having a receiving end and a discharge end and disposed to carry shreds from said receiving end to said discharge end, and deflector means disposed to deflect shreds from said shredding mechanism onto the receiving end of said shred conveyor.

5. A tire shredder as described in claim 2, in which:
said drive means includes three electric drive motors, one drivingly interconnected with said shredding mechanism, and one drivingly interconnected with said shred handling mechanism, said electric motors each having control means for regulation of the speed thereof, and said drive means further includes a motor generator disposed on said chassis and interconnected with said electric motors to provide electric power thereto.

6. A tire shredder as described in claim 1, in which:
said tire feeding mechanism includes a support conveyor, a receiving end and a discharge end, and being disposed to support tire carcasses thereon and carry said tire carcasses from said receiving end to said discharge end, and a press conveyor disposed above the discharge end of said support conveyor in spaced relationship therewith and having movable press means with a press surface disposed to travel in the same direction as the support conveyor and to compress tire carcasses passing between said support conveyor axially; and
said shred handling mechanism includes a shred conveyor having a receiving end and a discharge end and disposed to carry shreds from said receiving end to said discharge end and a deflector means disposed to direct shreds from said shredding mechanism onto the receiving end of said shred conveyor, and said shred handling mechanism further includes elevation positioning means at the discharge end of said shred conveyor disposed to position said discharge end at a predetermined elevation above a support surface.

7. A mobile tire shredder comprising:
a chassis having wheel means and propelling means;
a shredding mechanism mounted on said chassis and disposed to shred tire carcasses delivered thereto;
a tire feeding mechanism mounted on said chassis and operatively associated with said shredding mechanism, said tire feeding mechanism having a receiving portion disposed to receive tire carcasses and a discharge portion disposed to deliver said carcasses to said shredding mechanism;
a shred handling mechanism mounted on said chassis and operatively associated with said shredding mechanism, said shred handling mechanism having a shred conveyor with a receiving end and a discharge end, said shred conveyor being pivotally mounted on said chassis adjacent said shredding mechanism for movement from a stowed position in alignment with said chassis to a use position substantially perpendicular to said chassis; and drive means mounted on said chassis and including a motor generator and including a shredding mechanism electric drive motor drivingly interconnected with said shredding mechanism, a tire feeding mechanism electric drive motor drivingly interconnected with said tire feeding mechanism, a shred handling mechanism electric motor drivingly interconnected with said shred handling mehcanism, control means operable to regulate selectively and individually the speeds of said electric motors, and a motor generator mounted on said chassis and operable to deliver electric power to said electric motors through said control means.

8. A mobile tire shredder as described in claim 7, in which:

said tire feeding mechanism includes a support conveyor having a receiving end and a discharge end and a continuously moving upper surface traveling from said receiving end to said discharge end and disposed to support tire carcasses thereon, guide means operatively associated with said support conveyor adjacent the receiving end thereof and disposed to direct tire carcasses onto said receiving end, a press conveyor disposed above the discharge end of said support conveyor having a continuously traveling press surface disposed to travel in the same direction as the support surface of said support conveyor and in spaced relationship therewith, said press conveyor being mounted for reciprocal movement toward and away from the support surface of said support conveyor and having resilient means disposed to urge said press surface toward said support surface, and drive connection means drivingly interconnecting said support conveyor and said press conveyor to said feeding mechanism electric drive motor.

9. A mobile tire shredder as described in claim 7, in which:

said shredding mechanism includes a frame, a flywheel rotatably mounted on said frame on a generally horizontally disposed axle, a rotary blade disposed radially on one face of said flywheel and removably attached thereto, a fixed blade mounted on said frame adjacent said face surface of said flywheel and removably mounted thereon, said rotary blade and fixed blade being diposed to pass in shearing relationship as said flywheel rotates on said axle, and drive connection means drivingly interconnecting said flywheel axle to said shredding mechanism electric drive motor.

10. A mobile tire shredder as described in claim 7, in which:

said shredding mechanism includes a frame, a flywheel rotatably mounted on said frame on a generally horizontally disposed axle, a rotary blade disposed radially on one face of said flywheel and removably attached thereto, a fixed blade mounted on said frame adjacent said face surface of said flywheel and removably mounted thereon, said rotary blade and fixed blade being disposed to pass in shearing relationship as said flywheel rotates on said axle, and drive connection means drivingly interconnecting said flywheel axle to said shredding mechanism electric drive motor; and said tire feeding mechanism includes a support conveyor having a receiving end and a discharge end and a continuously moving upper surface traveling from said receiving end to said discharge end and disposed to support tire carcasses thereon, guide means operatively associated with said support conveyor adjacent the receiving end thereof and disposed to direct tire carcasses onto said receiving end, a press conveyor disposed above the discharge end of said support conveyor having a continuously traveling press surface disposed to travel in the same direction as the support surface of said support conveyor and in spaced relationship therewith, said press conveyor being mounted for reciprocal movement toward and away from the support surface of said support conveyor and having resilient means disposed to urge said press surface toward said support surface, and drive connection means drivingly interconnecting said support conveyor and said press conveyor to said feeding mechanism electric drive motor.

11. A mobile tire shredder as described in claim 10, in which:

said shredding mechanism further includes a shroud disposed to enclose said flywheel in close proximity with the periphery thereof and the rotating blade on said face surface, said shroud having a shred delivery throat communicating said shredding mechanism with said shred handling mechanism.

12. A tire shredder comprising:

a shredding mechanism having a support frame, a flywheel mounted on said support frame and rotatable with respect thereto, a radially directed blade block mounted on a face surface of said flywheel, a rotary blade removably mounted on said blade block, a fixed blade mounting block mounted on said frame adjacent the face surface of said flywheel, a fixed blade removably mounted on said fixed blade mounting block, said rotary blade and said fixed blade being disposed to pass in shearing relationship as said flywheel is rotated, and drive means interconnected with said flywheel and operable to rotate said flywheel on said frame;

a tire carcass feeding mechanism operatively associated with said shredding mechanism and having a receiving end disposed to receive tire carcasses and a delivery end disposed to deliver said tire carcasses to said shredding mechanism at the point of shearing relationship between said rotary blade and said fixed blade, and conveyor means disposed to convey tire carcasses from said receiving end to said delivery end, and press means operatively associated with the discharge end of said tire carcass feeding mechanism and disposed to engage and compress tire carcasses passing along the delivery end of said tire carcass feeding mechanism to said shredding mechanism, and drive means drivingly interconnected with said tire carcass feeding mechanism to drive said mechanism; and a shred handling mechanism interconnected with said shredding mechanism and disposed to receive shreds of tire carcasses from said shredding mechanism and deliver the same to a predetermined point of storage, said shred handling mechanism having drive means drivingly interconnected therewith for operation thereof.

* * * * *